Figure 1:
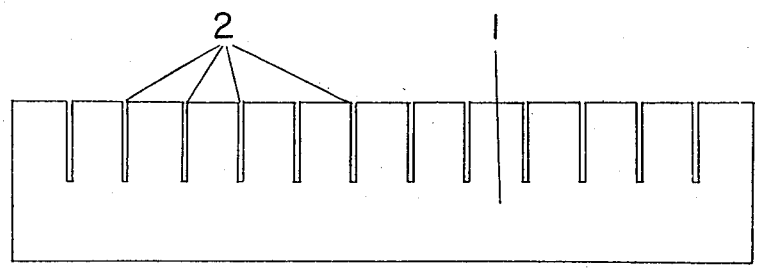

United States Patent [19]

Picard

[11] 4,081,121

[45] Mar. 28, 1978

[54] METHOD OF HIGH TEMPERATURE ASSEMBLY

[75] Inventor: Paul Picard, Romans, France

[73] Assignee: C.E.R.C.A., Compagnie pour l'Etude et la Realisation de Combustibles Atomiques, Paris, France

[21] Appl. No.: 639,202

[22] Filed: Dec. 9, 1975

[30] Foreign Application Priority Data

Dec. 13, 1974 France .................... 74 41937

[51] Int. Cl.² .............................................. B23K 1/04
[52] U.S. Cl. .................................. 228/181; 228/208; 228/217; 228/220; 228/221; 228/263
[58] Field of Search ............... 228/208, 214, 218, 219, 228/220, 221, 263, 217, 181

[56] References Cited

U.S. PATENT DOCUMENTS

| 3,440,712 | 4/1969 | Stroup et al. ............... 228/220 X |
| 3,512,245 | 5/1970 | Hermann ................... 228/221 X |
| 3,713,206 | 6/1970 | Galmiche et al. ........... 228/219 X |
| 3,883,944 | 5/1975 | Davis et al. ................. 228/220 X |

Primary Examiner—Al Lawrence Smith
Assistant Examiner—K. J. Ramsey
Attorney, Agent, or Firm—Dennison, Dennison, Meserole & Pollack

[57] ABSTRACT

A method of high temperature assembly of similar or different metallic, nonmetallic or partially metallic components without any direct contact with a cleaning flux, by means of an added metal or alloy with a melting point below that of the most fusible component, characterized in that the components to be assembled and the added metal or alloy are brought to a temperature at least equal to that required to melt the added metal or alloy, in a chamber from which air is substantially evacuated and which contains one or more halogens in the free or combined state, at least a fraction of these free or combined halogens being or passing into the gaseous state for at least part of the heating time.

9 Claims, 3 Drawing Figures

METHOD OF HIGH TEMPERATURE ASSEMBLY

The invention generally concerns a method of high temperature assembly for metallic, nonmetallic or partially metallic components by melting an added metal or alloy. It enables any type of assembly to be made between metals or alloys which may be similar or different, and also between metals or alloys on the one hand and nonmetallic elements or compounds on the other.

More particularly, the method of the invention makes it possible to form any type of assembly of metal elements by brazing. It is particularly advantageous when metal assemblies of complex shape and with thin walls have to be brazed in cases where the dimensional stability of the walls has to be preserved during the brazing operation. It also makes it possible to form assemblies where the resistance to corrosion, to low temperature, and to high temperature is quite comparable with that of the metals or alloys forming the components. Finally, the method of the invention is particularly suitable for forming brazed assemblies designed for use in nuclear reactors since it avoids the use of fluxes, thus eliminating the danger of contamination by chemical compounds which are usually nuclear poisons.

A very large number of high temperature brazing processes are known in the art, and present day methods are summarized, for example, in the articles by H. E. Pattee, "High Temperature Brazing", Welding Research Council Bulletin, No. 187, September 1973, pp. 1–47. In this article, the author explains that one of the essential problems of brazing is to achieve good wetting of the basic metal or alloy when the added metal or alloy melts, and penetration by capillary action into the gaps between the articles which have to be joined. The author explains that in order to obtain the wetting effect the articles to be assembled must be freed from any surface impurities and particularly from layers of oxide. This can be done by preliminary chemical or mechanical treatments or else by fluxes which have to be disposed of after brazing; such disposal is not always possible.

When the articles to be assembled have undergone preliminary cleaning, one still has to prevent them from being reoxidized when the temperature rises and before it reaches the melting point of the added alloy. It should in fact be noted that so-called high temperature brazing is generally carried out above 800° C, for in many cases the bond formed must be capable of resisting utilization temperatures of over 300° C, and possibly much higher. Furthermore, in cases where precipitation-hardened alloys are brazed, the operation has to be carried out at the temperature at which a solid solution is formed, which is often approximately 900° to 1000° C or even higher if the alloy is required to be used in the hardened state after brazing.

In order to avoid oxidation it is possible to heat the articles in a neutral, argon or helium atmosphere or under vacuum or in a reducing atmosphere.

Experience has shown that hydrogen gives fairly good results, provided that its dew point is sufficiently low, except when the alloys to be brazed are excessively charged with elements giving stable oxides, such as aluminum, titanium and also chromium. A neutral atmosphere or vacuum may give acceptable results provided that the articles to be brazed are perfectly cleaned in a preliminary step which is not always easy, and provided that there is no source of contamination of the surrounding area during the rise in temperature: degassing of the walls, various leakages, etc.

In order to avoid certain difficulties, H. E. Pattee points out in the above-mentioned article, that articles made of alloys based on nickel may be surface-nickeled. This considerably improves the wetting of the articles by the added metal or alloy although it has the disadvantage of producing a spreading action which is often excessive and troublesome. This technique has been found difficult to carry out in practice. The film of nickel, deposited by electrolysis, has to be thin and adhesive and the increase in temperature has to be very slow in order to prevent the film from coming off. For some applications, the excess nickel has to be removed chemically after brazing. In short, the nickel thus deposited becomes partly incorporated in the brazed joint which is not always desirable.

Drawbacks of the same type are met with in the process described in the third addition No. 75,044 to French Pat. No. 1,198,870, Philippe Galmiche et al, which comprises brazing in the presence of a cement formed by a mixture of chromium and fluorides and in a reducing atmosphere. The chemical depositing of chromium from fluorides in the vapor phase would encourage elimination of the surface layer of oxide and thus encourage wetting of the articles to be assembled by the added metal or alloy. In the fourth addition No. 76,035 to the main patent, the inventors specified that the reducing atmosphere should be hydrogen or cracked ammonia. Although this process gives interesting results, it has the serious disadvantage of forming a diffused chromium deposit on all the articles to be brazed. This changes the physical properties of the alloys and may have serious consequences when they are used.

The method of the invention makes it possible to eliminate all the disadvantages of the previous techniques just described. Firstly, it completely eliminates the operations of mechanical or chemical preparation of the surface. The surface film of oxide on the articles to be brazed is in fact eliminated without using a flux during the rise in temperature without any appreciable change in the thickness of the articles. Any traces of grease and fingerprints resulting from handling during the assembly of the articles are at the same time totally eliminated. When the added metal or alloy fuses its penetration by capillary action into the gaps between the articles is in fact noticeably facilitated, thus making it possible to form complex assemblies with deep, narrow gaps which are totally filled by the added metal or alloy. At the same time, there is no excessive spreading of the added metal or alloy over the surfaces of the articles to be assembled, as is the case with preliminary nickel plating or with deposits in the vapor phase.

The method which will subsequently be described in greater detail basically comprises heating the assembly to be brazed with the added metal or alloy already positioned on it at the points where the bonds are to be formed or in their immediate vicinity, in a chamber from which air has been substantially evacuated and in which a very low pressure of one or more halogens in a free or combined state will be established during the rise in temperature.

In order to establish the very low pressure, a small quantity of one or more halogen compounds may, for example, be placed inside the chamber. Depending on the vapor tensions of the compound or compounds, their evaporating speed can be adjusted by placing them in warmer or cooler parts of the chamber. Similarly, their action relative to the assembly to be brazed can be adjusted by changing the relative positions of the assembly and of the emplacements for the halogen compound or compounds. In cases where compounds with a high vapor tension or halogens in the free state are used, it is possible to inject them into the chamber from outside while adjusting the flow rates in a manner known in the art, so as to obtain the very low pressure desired inside the chamber. Another possibility is to combine the two methods just described of creating a very low pressure halogen containing atmosphere.

Under these conditions, as soon as the temperatures are high enough reactions will take place between the halogen containing gas and the assembly to be brazed, during which the surface layers of oxide will be substantially eliminated. The higher the temperature, the more rapidly the reactions will take place.

The choice of halogen or halogens or of halogen compound or compounds depends on many factors and should be made bearing in mind the nature of the constituents of the articles to be brazed and of the added metal or alloy and the brazing temperature.

Depending on the nature of the layers, chiefly of oxides, and impurities on the articles to be brazed and on the added metal or alloy, one or more of the four halogens I, Br, Cl and F may be used, either in the free state or combined.

However, in the case of stainless or refractory steels and alloys based on nickel cobalt or chromium, the best results are obtained with compounds containing fluorine. The choice of compounds depends much on the conditions of use, but preference is generally given to alkaline fluorides, ammonium fluoride or acid ammonium fluoride, alkaline-earth fluorides and some other metallic fluorides such as those of Al, Ni, Fe, Co, Cr, Mn, Ti, and Zr. Complex fluorides such as ammonium fluoaluminate $Al F_3(NH_4F_3)$ or cryolithe ($Al F_3$, $3NaF$) can also be employed successfully. This preference is due to the fact that fluorides are vey reactive and that many fluorides give gaseous fluorine containing compounds, within the pressure range below 1 torr, at elevated temperatures close to the brazing temperatures. The halogen containing atmosphere thus forms at a temperature of great reactivity. It is also well known that fluorides do not exert a pitting action as do other known halides such as chlorides. Although more difficult to use one can employ the halogen acids themselves HI, HBr, HCl, HF or halogens in the pure state I, Br, Cl and F. However, halogen compounds which are solid and stable in air are generally preferred because they are easier to use.

In the case of compounds which have a vapor tension of less than $10^{-4}$ torr at room temperatures, the simplest method is to place a suitable quantity of them in the actual brazing chamber in one or more selected emplacements so that during the heating of the assembly or assemblies to be brazed the compound or compounds will be brought to a high enough temperature to make their vapor tension high enough to create the desired partial pressure of halogen containing gas within the chamber. This partial pressure will generally be less than 1 torr.

The nonrestrictive examples which follow are given to explain the conditions under which the invention can be applied.

EXAMPLE I

The method of the invention is applied to brazing Inconel 718, a trademark of International Nickel Co. for an alloy of the following composition:

Ni: 50 – 55%
Cr: 17 – 21%
Nb + Ta: 4.75 – 5.50%
Mo: 2.80 – 3.30%
Ti: 0.65 – 1.15%
Al: 0.2 – 0.8%
Fe + impurities: remainder by means of a Nicrobraz 50 alloy, a trademark of Wall Colmonay Limited of the following composition:

Cr: 13%
P: 10%
Ni + impurities: remainder

The added alloy is in the form of a paste comprising a metal powder coated in an organic, fluid substance. Sodium fluoride is used as the source of halogen containing gas.

Figure 2:
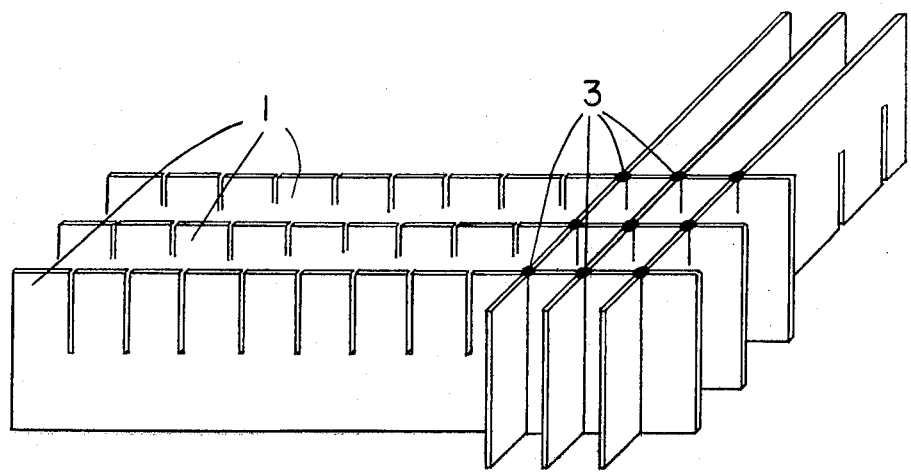
Figure 3:
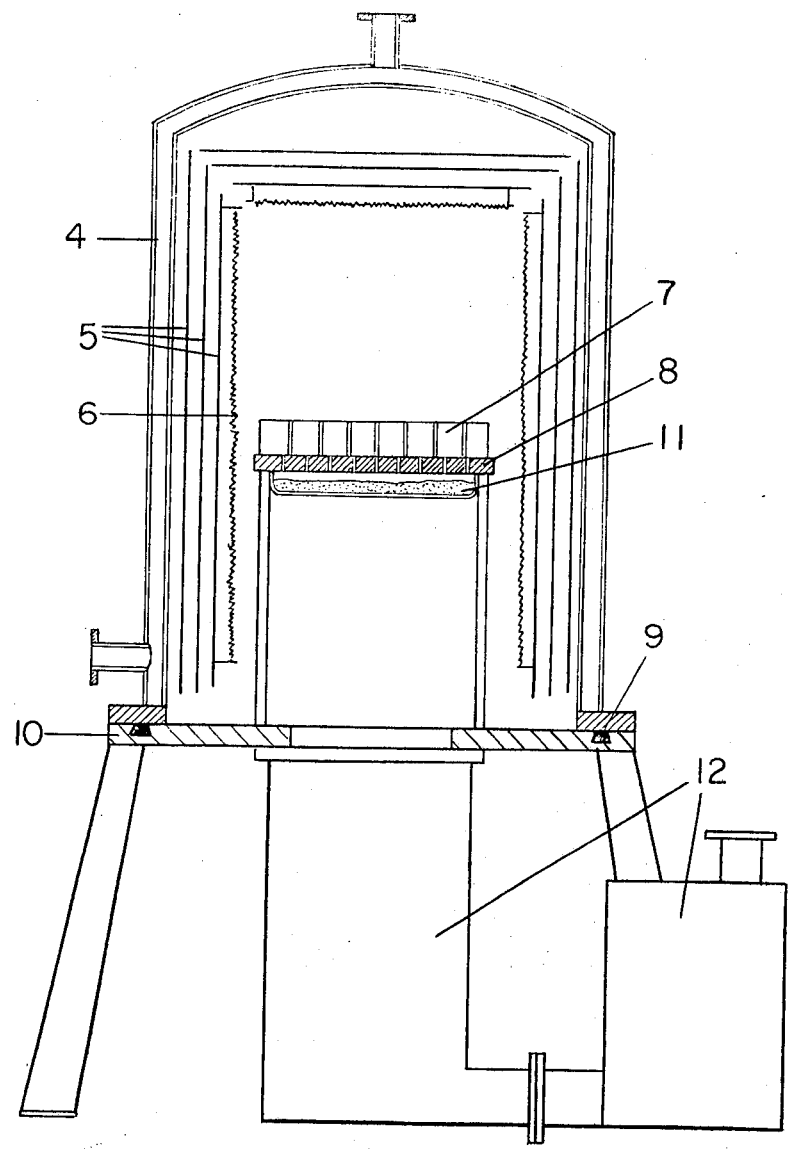

The above example will now be further described in conjunction with the drawings in which: FIGS. 1 and 2 are plan views showing the work to be brazed; and FIG. 3 is a view partly in section illustrating the method of the invention.

The assembly to be brazed, FIG. 1, comprises small, rough-rolled plates 1 of Inconel 718 sheeting 0.3 mm thick and about 34 mm high. Each plate has slots 0.5 mm wide 2 cut into it over half its height, and the plates are then engaged in one another to form a grid, FIG. 2. A drop of added alloy 3 is deposited at the top of each intersection in the grid. The brazing operation is carried out in a furnace of the type shown diagrammatically, FIG. 3. This includes a vacuum-tight bell with a double wall 4, inside which water is circulated to maintain a temperature below 100° C. Internal screens 5 of refractory steel act as heat insulators. A molybdenum heating resistance 6 mounted on suitable insulating means (not shown) enables the assembly 7 to be heated by radiation after it has been positioned inside the furnace, the bell having been previously removed, on a supporting plate 8 which bears on the base of the furnace by means of a tripod. The supporting plate is perforated with holes. A seal 9 placed in a groove in the base of the furnace 10 is designed to make the chamber air-tight. Below the supporting plate about 20 g of NaF is placed in an open receptacle 11 before the bell is put in position; this quantity is to some extent related to the total area of the plates forming the assembly, which is about 50 dm². When the heating bell has been positioned, a vacuum is formed in the furnace by means of a pumping unit 12 of the conventional type, comprising a primary pump with a rotary piston and a secondary pump operating by oil diffusion. When the residual pressure in the chamber reaches $10^{-4}$ torr, the resistances 6 are set to heating without interrupting the pumping action. The temperature of the assembly is thus brought to 1000° C in half an hour then, after holding it at that temperature for about half an hour, left to cool to ambient temperature. The temperature of the sodium fluoride doesn't reach more than 1000° C.

When the furnace is opened the assembly is found to be perfectly brazed over its entire height, with the added alloy filling all the gaps between the interlinked plates but without any appreciable spread over the surface of the plates and without flowing below the assembly. The surface of the assembly is very shiny and the slight grease marks or fingerprints which were present before the brazing operation have disappeared. There is no measurable change in dimensions. Tests for corrosion carried out in steam at 400° C and at a pressure of 105 kg/cm² do not give evidence of any corrosion after 750 hours of testing. This shows conclusively that no halogen compound has contaminated the assembly. Tests with a saline mist give identical results. When the mechanical properties of such assemblies are measured, the results obtained are generally superior to those obtained with other brazing methods.

Furthermore, a comparison is made using the same Inconel 718 assemblies, between operating conditions in a brazing cycle carried out by the method of the invention and those in a cycle carried out by a conventional method as previously used.

Results are set out in the table below:

TABLE I

| | CONVENTIONAL METHOD | METHOD ACCORDING TO THE INVENTION |
|---|---|---|
| Surface Preparation | Degreasing with trichloroethylene<br>Cleaning with a fluonitric mixture<br>Electrolytic cleaning<br>Prenickeling in a Wood bath<br>Nickeling in a Watts bath<br>Thickness deposited:<br>12 to 15 microns of Ni | No Surface Preparation |
| Brazing Cycle | Evacuating 30 mins<br>Introduction of hydrogen<br>Slow rise to 1005° C with degassing stage 3 hrs<br>Stage at 1005° C 2 hrs<br>Cooling 2 hrs | Evacuating 30 mins<br>Rise to 1005° C 30 mins<br>Stage at 1005° C 30 mins<br>Cooling 120 mins |
| Duration of Cycle | 7 hrs 30 min | 3 hrs 30 min |

The method of the invention can be seen to eliminate any preparation of the articles before brazing, and in particular to avoid the tricky nickel-plating operation as well as the surface-preparing treatments which precede it.

It also allows for a very rapid rise in temperature whereas in the conventional method the temperature has to rise slowly in order to prevent the film of nickel from coming away. In the conventional method, finally, when the article has been heated under vacuum it has to be put in a hydrogen atmosphere for the brazing operation, thus introducing an additional complication.

Hence, the method of the invention gives better quality results although the means used are very simple, economic and quick to apply. There is consequently a marked increase in productivity.

With an identical cycle, in the same atmosphere and using the same added alloy with excellent results it is possible to braze stainless steel to itself, stainless steel to Inconel 718 or molybdenum to Inconel 718.

EXAMPLE II

An assembly identical with that in Example I is brased using the same added alloy but with chromium trichloride instead of the sodium fluoride. Other things being equal, it is found that the chromium salt has to be placed in part of the chamber where the temperature is about 100° C below that of the assembly to be brazed, in order to avoid too quick evaporation. Under these conditions brazing can be carried out with good results.

EXAMPLE III

An assembly identical with that in Example I is brazed using the same added alloy but with sodium bromide as the source of halogen gas. This time the salt is placed in part of the chamber where the temperature is about 200° C below that of the assembly to be brazed. Under these conditions brazing can equally be carried out with good results.

EXAMPLE IV

Tantalum is a material which has to be brazed with care in order to prevent oxides, nitrides, hydrides and carbides from forming on the surface of the articles being assembled, after cleaning. Because of this reactivity conventional brazing methods employ either a high vacuum or an atmosphere of argon or very pure helium as the atmosphere in the furnace.

It is always necessary for the surfaces to be cleaned perfectly before brazing. The method of the invention is applied to brazing sheets of rough-rolled tantalum without any preliminary surface preparation. A binary alloy based on gold and containing 27% nickel is used as the added alloy. The melting point of this alloy is about 1020° C. The two sheets to be assembled in the form of plates 2 mm thick are arranged in an inverted T shape with one horizontal and the other vertical. The added alloy in the form of a wire is placed along the joint. The halogen containing atmosphere is obtained with chromium trifluoride arranged as in Example I.

When the assembly has been placed in the chamber a vacuum of about $10^{-4}$ torr is obtained with the aid of the unit, then the heating is turned on so that the assembly and the fluoride reach a temperature of 1100° C in 45 minutes. After a 10 minute stage at brazing temperature the assembly is left to cool.

Examination of the assembly shows the added metal to have penetrated the whole length and width of the joint without leaving any cavity. The assembly has also acquired a shiny metallic appearance.

EXAMPLE V

Molybdenum, like tantalum, is a refractory alloy which can be brazed by conventional methods if strict conditions are observed relative to the cleanliness of the materials and the brazing atmosphere; thorough cleaning of the articles and a very high vacuum during the high temperature stage.

Molybdenum can be brazed with various alloys. When the articles have to be resistant to high temperature, brazing alloys based on gold such as that described for brazing tantalum (Example IV), or based on nickel such as that used for brazing Inconel (Example I) are used for brazing molybdenum by the method of the invention. It is also possible to use added alloys based on silver. The added alloy used in this example is a ternary alloy based on Ag and containing Cu 30%, Pd 1%, remainder Ag + impurities, with the melting point of about 875° C.

The articles to be assembled are two sheets of rough-rolled molybdenum 1.5 mm thick, arranged in an inverted T shape with one placed horizontally and the other vertically. The added alloy in the form of a wire is arranged along the joint to be brazed. The halogen atmosphere is obtained with potassium fluoride placed near the article to be brazed, in an arrangement similar to that in FIG. 3.

When the articles have been placed in the chamber a vacuum of about $10^{-4}$ torr is obtained inside the chamber by means of the pumping unit, then the heating is turned on so that the articles and the fluoride reach a temperature of 950° in about 30 minutes. After being held for 30 minutes at brazing temperature, the assembly is left to cool.

Examination of the assembly produced shows that the added metal has penetrated perfectly over the whole length of the joint and has perfectly filled in the space between the articles. The two assembled plates have additionally acquired a shiny metallic appearance.

EXAMPLE VI

With a view to studying the influence of residual pressure as measured by vacuum gauges, a new brazing test of Inconel 718 using as added alloy Nicrobraz 50, is carried out, using sodium fluoride as the source of halogen containing gas as in Example I. The assembly to be brazed is identical with that described in Example I and the furnace used is the same. The conditions for positioning the assembly, the added alloy and the sodium fluoride in the chamber of the furnace, and also the quantities used, are the same as described in Example I and shown in FIGS. 1, 2, and 3.

When the heating bell has been positioned a vacuum is created in the chamber by means of the pumping unit described in Example I. Pumping is continued at a temperature of about 200° C until a residual pressure of $10^{-5}$ torr is obtained. The chamber is then filled with argon of over 99.995% purity, to atmospheric pressure. The chamber is then again evacuated using the primary pump only. When the residual pressure reaches $10^{-2}$ torr, the furnace is set to heating without interrupting the primary pumping. The temperature is thus brought to 1010° C in about ¼ hour then after keeping it there for about ¼ hour is allowed to drop to ambient temperature, while the primary pumping is still continued in the chamber. It should be noted that during the increase in temperature the residual pressure substantially exceeds $10^{-2}$ torr although it is still below $10^{-1}$ torr.

When the furnace is opened the added alloy is found to have flowed along the joints and adequately filled the gaps to be brazed. However, instead of being bright white in appearance, all the components are found to be dull grey, thus proving the existence of surface contamination in the metal.

EXAMPLE VII

A new trial brazing of an assembly of Inconel 718 is carried out in the same way as in Example VI, except for the vacuum conditions during the rise in temperature. After a preliminary degassing under the same conditions as in Example VI, i.e., after reaching a residual pressure of $10^{-5}$ torr at a temperature of abour 200° C, the chamber is in fact filled with an argon of the same quality as that used in Example VI, then the argon pressure in the chamber is reduced to a residual value of 1 torr by means of the primary pump. The chamber is then cut off from the pumping unit by closing a connecting valve, then heating is applied and a temperature of 1010° C is maintained in the same way as in Example VI. At 1010° C, a maximum pressure of 5 torr is obtained in the chamber. When the chamber has been cooled to ambient temperature the pressure returns substantially to its initial value of 1 torr.

When the furnace is opened it is found that the added alloy has only partially penetrated into the gaps to be brazed and that the components have consequently not been strongly assembled. Moreover, the components have a uniformly dull grey appearance which, as in Example VI, but more seriously, result from surface contamination of the components to be assembled.

Examples VI and VII show the importance of using a very low residual pressure when applying the method of the invention. Although acceptable results can be obtained, as demonstrated by Example VI, by brazing at a residual pressure of approximately $10^{-1}$ torr, it is clear from Examples I to V that the best results are obtained when the brazing operation takes place at residual pressures of the order of $10^{-4}$ to $10^{-5}$ torr. It should be pointed out that these pressures are measured by means of gauges located in a cold part of the chamber and often close to the inlet of the secondary pump. The readings given by the gauges are thus slightly below the pressures obtaining in the hot part in the immediate vicinity of the assembly to be brazed. In fact, the halogen compounds from which vapors are given off in the hot part of the chamber usually have very low vapor tensions at room temperature, which means that the vapors are condensed before reaching the cold parts, where the gauges for measuring the vacuum are located.

These are phenomena which are well known in the art and which result in inevitable inaccuracy in the measurement of residual pressure. Thus, although the best brazing results were obtained in Examples I to V at residual pressures of about $10^{-4}$ torr or below, it is clear that the method of the invention can be applied with excellent results by operating at residual pressures above $10^{-4}$ torr and of up to $10^{-2}$ torr of slightly more.

For some relatively simple brazing processes the method of the invention can be applied at still higher pressures, but without substantially exceeding 1 torr.

The examples just given in no way limit the field of application of the invention. Non-metallic components, such as carbides, borides, metallic oxides or graphite, can in fact also be assembled by the method of the invention. In all these cases it is possible to obtain very effective wetting of the components to be assembled by the added metal or alloy, thus producing an assembly which can resist physical or chemical strains under optimum conditions.

Such assemblies can in particular be completely fluid-tight, owing to the exceptional capacity for filling all the gaps, conferred on the added metal by the method of the invention.

It is also possible to assemble nonmetallic components such as those just mentioned, with metals or alloys. This operation, which is often very difficult by the usual methods, is considerably facilitated by the process of the invention.

The process of the invention is also suitable for making sandwich structures such as those comprising a thin cellular core, often in the form of a bee's nest included between two thicker walls. Such structures have applications particularly in the aerospace field and necessitate brazing operations which are difficult to carry out by conventional methods.

Finally, the process of the invention also makes it possible to assemble alloys obtained by consolidating metal powders, grains or particles of alloys reinforced by dispersed phases or by fibers, with other similar or different alloys or metals or with nonmetallic components.

All these extremely varied applications utilize the method of the invention in different forms and form an integral part of it.

I claim:

1. In a fluxless method of high-temperature assembly or brazing, of similar or different, metallic, nonmetallic or partially metallic components by means of bonding with an added metal or alloy with a melting point below that of the most fusible component without mechanical or chemical preparation of the surfaces of the components at the areas to be bonded to remove oxide contaminants, the improvement comprising effecting assembly by the successive steps of:
   a. positioning the components in an assembled relationship with the metal or alloy to be added immediately adjacent areas of the components where bonds are to be formed;
   b. positioning the assembly of (a) in a chamber and establishing a residual pressure of below about 1 torr;
   c. heating the assembly of (b), while maintaining the residual pressure below about 1 torr, to brazing temperature at least equal to a temperature required to melt the added metal or alloy in the presence of one or more halogens derived from one or more halogens in a free or combined state utilized in a manner so as to only exert a partial pressure that does not interfere with maintaining said residual pressure below about 1 torr to eliminate any surface film of oxide on the components to be bonded;
   d. subjecting the assembly of (c), while maintaining the residual pressure below about 1 torr, to the brazing temperature, above about 800° C, while maintaining the residual pressure below about 1 torr, for a sufficient time for the added metal or alloy to substantially fill the areas where bonds are to be formed without appreciable spread of the bonding metal or alloy over surfaces of the components in areas not to be bonded and without significant halogen contamination of the components in areas not to be bonded; and
   e. cooling the bonded assembly to ambient temperature.

2. The method of claim 1 wherein the residual pressure in the chamber at brazing temperature is below $10^{-2}$ torr.

3. The method of claim 1 wherein the components to be assembled are refractory metals or metal alloys.

4. The method of claim 1 wherein one or more preferably solid halogen containing compounds are placed in the chamber in one or more emplacements, which are selected so that during the heating process they are brought to a temperature high enough to give off halogen containing gases for at least part of the heating time.

5. The method of claim 1 wherein the halogen containing compound or compounds are selected from the group consisting of ammonium fluoride, ammonium bifluoride, fluorides, of Na, K, Li, Ca, Be, Mg, Zn, Cd, Al, Ni, Fe, Co, Cr, Mn, Mo, Ti, Zr, Hf, S and fluoaluminates of ammonium Na, K and Li.

6. The method of claim 1 wherein the components to be assembled are plates, bars or tubes.

7. The method of claim 1 wherein the components to be assembled are sandwich structures.

8. The method of claim 1 wherein the components to be assembled are metallic or nonmetallic articles of any shape.

9. The product obtained by the method of claim 1.

* * * * *